United States Patent
Cole et al.

(10) Patent No.: US 9,313,474 B1
(45) Date of Patent: Apr. 12, 2016

(54) STEREOSCOPIC VIDEO ENCODING AND DECODING METHODS AND APPARATUS

(71) Applicant: Next3D, Inc., Atlanta, GA (US)

(72) Inventors: David Michael Cole, Pembroke Pines, FL (US); Alan McKay Moss, Signal Mountain, TN (US); David Roller, Jr., Atlanta, GA (US)

(73) Assignee: NEXTVR INC., Laguna Beach, CA (US)

( * ) Notice: Subject to any disclaimer, the term of this patent is extended or adjusted under 35 U.S.C. 154(b) by 275 days.

(21) Appl. No.: 14/107,852

(22) Filed: Dec. 16, 2013

Related U.S. Application Data

(62) Division of application No. 12/862,457, filed on Aug. 24, 2010, now Pat. No. 8,610,757.

(60) Provisional application No. 61/236,208, filed on Aug. 24, 2009.

(51) Int. Cl.
 *H04N 13/00* (2006.01)

(52) U.S. Cl.
 CPC ....... *H04N 13/0018* (2013.01); *H04N 13/0048* (2013.01); *H04N 2213/007* (2013.01)

(58) Field of Classification Search
 None
 See application file for complete search history.

*Primary Examiner* — Geepy Pe
(74) *Attorney, Agent, or Firm* — Straub & Pokotylo; Michael P. Straub; Abbas Zaidi

(57) ABSTRACT

Methods and apparatus for stereoscopic image encoding and decoding are described. Left and right eye images are encoded following an entropy reduction operation being applied to one of the eye images when there is a difference between the left and right images of an image pair. Information about regions of negative parallax within the entropy reduced image of an image pair is encoded along with the images. Upon decoding a sharpening filter is applied to the image in an image pair which was subjected to the entropy reduction operation. In addition edge enhancement filtering is performed on the regions of the recovered entropy reduced image which are identified in the encoded image data as regions of negative parallax. Interleaving of left and right eye images at the input of the encoder combined with entropy reduction allows for efficient encoding, storage, and transmission of 3D images.

18 Claims, 14 Drawing Sheets

STEREOSCOPIC VIDEO ENCODING AND DECODING METHODS AND APPARATUS

RELATED APPLICATIONS

The present application is a divisional of U.S. patent application Ser. No. 12/862,457 filed Aug. 24, 2010, which is hereby expressly incorporated by reference in its entirety.

FIELD

The present invention relates to the field of stereoscopic imagery and more particularly, to the field of digital stereoscopic video acquisition, distribution and playback including, e.g., methods and apparatus for encoding and decoding stereoscopic video and/or modifying stereoscopic video for presentation.

BACKGROUND

Conventional stereoscopic video normally requires twice the storage capacity, transmission bandwidth and playback bandwidth of 2-dimensional video. This is because stereoscopic video requires that two image streams be produced, e.g., one for the left eye and one for the right eye. The burden of the second video data stream can overwhelm existing modalities for content distribution (e.g. DVD disc, internet transmission, cable broadcast). Additionally, the burden of the second video data stream can exceed the data transfer capabilities of local storage media and the rendering capabilities of consumer digital video playback hardware.

In view of the above, it should be appreciated that there is a need for improved methods of encoding stereoscopic video, decoding stereoscope video and/or manipulating stereoscopic video for presentation to take into consideration such factors as screen size and/or viewer preferences.

SUMMARY

Various features and embodiments are directed to methods and apparatus for encoding and/or decoding digital stereoscopic images, e.g., images forming a video.

In accordance with one embodiment of the present invention left and right eye images are interleaved and encoded.

Prior to encoding a pair of left and right eye images, the luminance components of the left and right images may be analyzed to determine an amount of difference between the left and right eye images. The determined amount of difference in some embodiments is indicated in a difference metric generated by comparing the left and right eye images.

In some embodiments if there is no difference between the luminance components of the left and right eye images, the left and right eye images are encoded without being modified, e.g., using an interframe coding process. In some such embodiments, the coding involves including in the encoded bitstream an indicator indicating that there is no difference between the left and right eye images of an image pair allowing for efficient coding and avoiding the need to include a full set of image data corresponding to both the left and right eye images.

If the difference determination indicates a difference between the left and right eye images, in some embodiments one of the left and right eye images, e.g., the right eye image, is subject to an entropy reduction filtering operation. In some embodiments the amount of entropy reduction filtering applied is a function of the determined difference between the left and right eye images. While application of entropy reduction to the right eye image is used in the example to explain the invention, the entropy reduction could be applied to the left eye image instead.

In some embodiments the amount of entropy reduction applied to the right eye image is greater when the difference between the left and right eye images is small and the amount of entropy reduction decreases as the amount of entropy increases. The entropy reduction filtering operation, in various embodiments, reduces the contrast within the image, e.g., smoothes the image. This will, in many cases, increase coding efficiency and reduce the amount of data required to represent the entropy reduced image.

While the entropy reduction filtering applied to one of the images can increase coding efficiency and thereby reduce the amount of data need to represent a pair of left and right eye images, it has the potential to reduce the sharp edges of objects which are to be shown extending out from the screen. Visual cues provided by sharp edges in combination with the amount of difference between the left and right eye images can be important for a good 3D image viewing experience.

In some but not necessarily all embodiments, the left and right eye images are analyzed as part of the encoding process to identify image regions of negative parallax. In some embodiments information identifying the image regions in the entropy reduced image where negative parallax occurs is stored and included in the set of data representing the encoded pair of left and right eye images. The region identifying information may be included with the encoded image data as metadata along with the difference metric determined by comparing the left and right eye images being encoded.

The encoding process may be repeated for multiple left and right eye image pairs with the encoded data forming a sequence of encoded left and right eye image pairs. The coding of the left eye image and entropy reduced right eye images is performed, in some embodiments, by supplying a sequence of processed image pairs to an encoder such as an H.264 AVC coder which performs encoding using motion compensated discrete cosine transform based compression on the images, e.g., the interleaved left and right eye frames. The result, e.g., sequence of encoded frames, of the encoding along with the metadata corresponding to encoded frame pairs is stored in a file and/or transmitted.

While in some embodiments the encoded images are decoded and displayed allowing an operator of the encoding system to monitor the quality of the encoded images, the encoded bitstream is normally communicated to a playback device for retrieval, decoding and display.

Various features are directed to decoding and displaying stereoscopic images encoded in accordance with one or more of the encoding embodiments described herein.

In at least one decoding embodiment the encoded frames are decoded along with the metadata including the determined difference metric and indicating the regions of negative parallax in entropy reduced images. The decoding may be performed using a decoder which performs decoding in a manner consistent with the encoding/compression standard which was used to encode the frames. The decoded left and right frames of each frame pair are subject to further processing prior to display.

In some embodiments, a determination is made as to whether or not entropy reduction was performed on an image in the frame pair, e.g., the right eye image for purposes of explaining the invention. In one embodiment this determination can be made by examining the difference metric included in the metadata communicated with a frame pair. In some embodiments a zero difference metric indicates that entropy reduction was not used while a non-zero metric indicates that entropy reduction was performed on one of the images of a frame pair.

In one embodiment if one of the images in the decoded frame pair was subject to entropy reduction filtering as part of the encoding process, a sharpen filtering operation is applied to the entropy reduced image. Portions of the sharpened image are then subject to edge enhancement. In some embodiments the edge enhancement operation is applied to the image regions identified as being regions of negative parallax regions, e.g., as indicated by the metadata. In some embodiment the regions to be filtered are determined from polygonal region information associated with the frame pair being processed. This information may be recovered from the metadata associated with the frame being processed.

The edge enhancement operation enhances, e.g., strengths, edges within the image region subject to the edge enhancement. Thus, edge in image regions where negative parallax was detected in the entropy reduced image being processed are enhanced. This helps restore the sharp edges of three dimensional images which facilitates, along with the difference between the left and right eye images, the perception by a viewer of the 3D nature of an image. The edge enhancement is limited, in some but not necessarily all embodiments, to image portions where negative parallax was detected to avoid strengthening of edges due to block coding artifacts throughout the image. Thus, while edge sharpening may be desirable for 3D regions in areas of negative parallax, applying it to the entire image may be undesirable and is avoided for this reason in some embodiments.

In some embodiments, the strength of the edge enhancement filtering is a function of the difference metric communicated with the image pair being processed. The lower the difference metric the stronger the edge enhancement. This counters the relatively higher amount of entropy reduction filtering applied to images with lower difference metrics than is applied to images with high difference metrics.

The decoded full resolution image and processed entropy reduced image of an image pair, in the case of an image pair where entropy reduction was applied to one of the images, is supplied to a processor which renders the images for output to a 3D display device in accordance with the rendering requirements of the particular display.

In cases where entropy reduction was not applied to either of the left and right eye images since there was no detected difference between the luminance components of the images, the decoded left and right eye images are supplied to the processor for rendering.

Thus, images which were subjected to entropy reduction as part of the encoding process are enhanced to reduce the potential effects of the entropy reduction while images which were not subject to entropy reduction are decoded and provided for rendering without the use or need for the enhancement operations performed on the entropy reduced images.

The encoding and decoding methods of the present invention which involve the interleaving of left and right eye images as part of an interframe encoding process, take advantage of the high degree of similarity between left and right eye images. Since many eye images may not include 3D effects or features, a large number of image pairs will include two eye images which are the same allowing for one image to be efficiently coded by simply indicating a no difference or repeat of the other eye image in the left and right eye image pair. For image pairs where there is a difference, the selective application of entropy reduction with the amount of entropy filtering depending on the difference between images in the image pair, results in an efficient encoding method due to reduction in image entropy while still providing good image results and 3D image effects.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

The present invention is directed to methods and apparatus for encoding and decoding stereoscopic video and/or modifying stereoscopic video for presentation.

Figure 1:
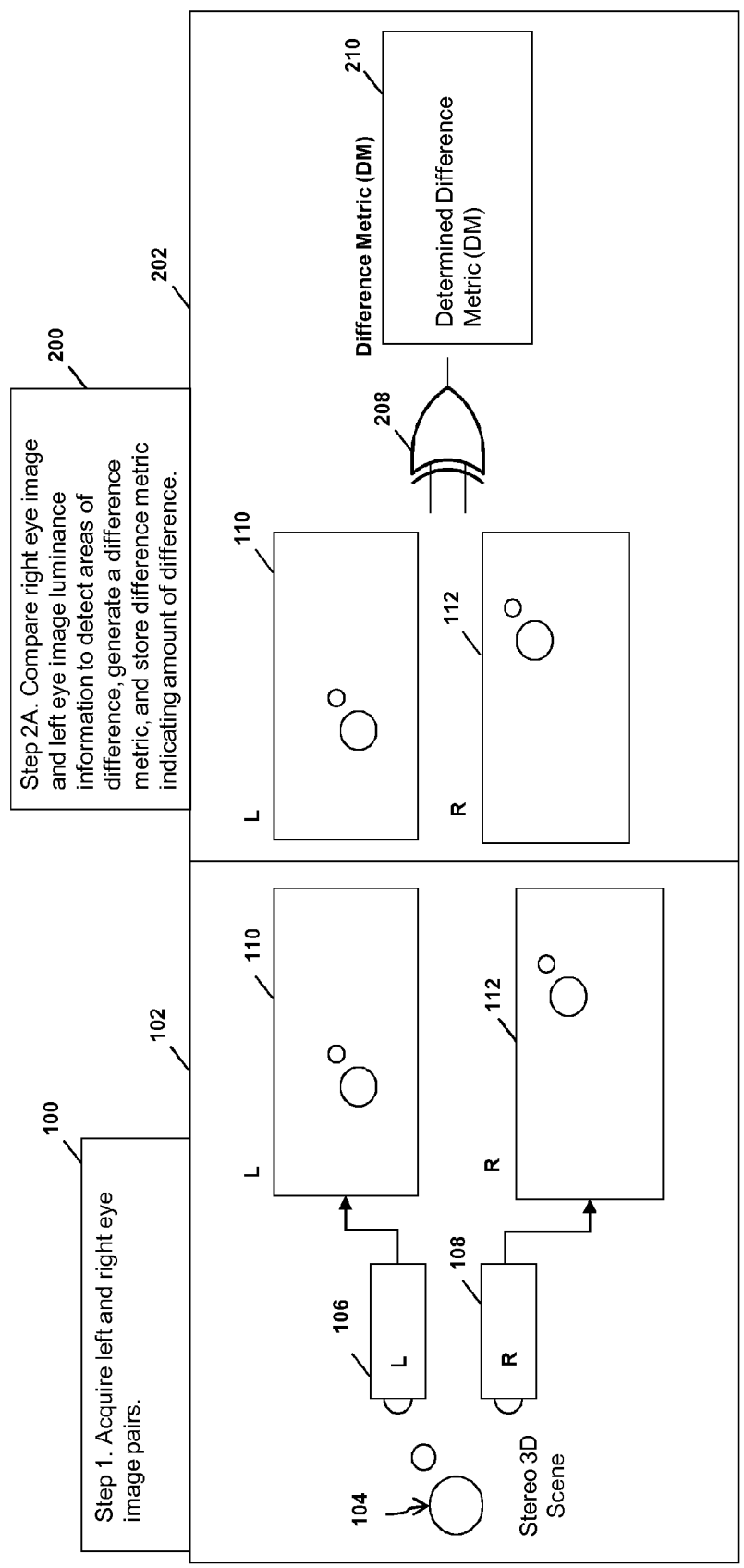
FIG. 1-13 illustrate various processing steps which may, and sometimes are, performed in one exemplary embodiment.

FIG. 1 illustrates steps 1 of processing implemented in accordance with one exemplary embodiment of the invention. Step 1 100 involves performing stereo video image acquisition and editing. As shown in box 102, in step 100 a stereo 3D scene 104 is captured by separate left and right cameras 106, 108 which produce left and right images 110, 112. The left and right eye images may be represented by pixel values. In a monochrome embodiment the pixel values are simply luminance pixel values. Step 100 may be implemented using known image acquiring and editing methods. Operation proceeds from step 100 to step 2A 200.

Step 2A 200 includes comparing the right eye image 112 and the left eye image 110 luminance information to identify areas of difference and generate a difference metric as a function of the amount of detected difference between the left and right eye images 110, 112. The difference metric is stored, e.g., in memory, for subsequent use and inclusion as metadata with the pair of eye images being encoded. In one embodiment the luminance value of a pixel in the left eye image 110 at a location is XORd, as represented by XOR operation 208, with the luminance value of the pixel at the corresponding image location in the right eye image 112. If the two pixel values are the same the XOR results in a 0. However, if they are different a 1 is output. By XOR'ing the pixel values of the left and right image conveying luminance information, and summing the result, a count of the number of pixels which differ in the left and right eye images 110, 112 is generated. This count represents a difference metric 210 which is used to control subsequent processing in some embodiments. The larger the value of the difference metric 210 the greater the indicated difference between the left and right eye images 110, 112 of an image pair. In other embodiments comparison techniques other than an XOR are used to detect differences between the left and right eye images 110, 112.

Figure 2:
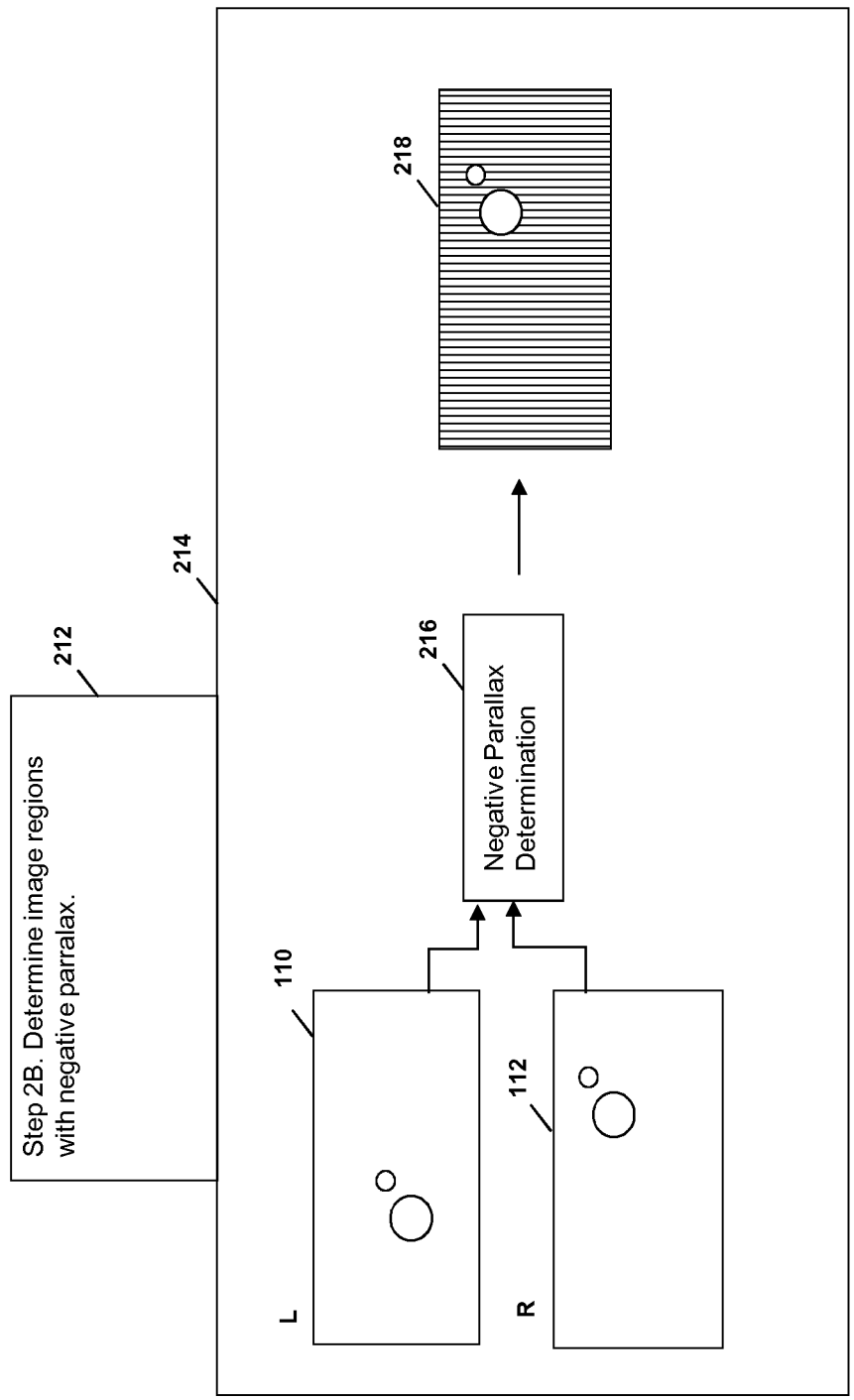

In addition to generating a difference metric, in step 2B 212 shown in FIG. 2, the left and right eye images 110, 112 are processed to determine regions of one of the eye images, e.g., the right eye image 112 for purposes of this example, of negative parallax. FIG. 2 illustrates step 2B of processing implemented in accordance with one exemplary embodiment of the invention. As shown in box 214, step 2B includes determining in step 216 regions of negative parallax. The unshaded portions of image 218 represent detected regions of negative parallax with the right eye image 112.

Figure 3:
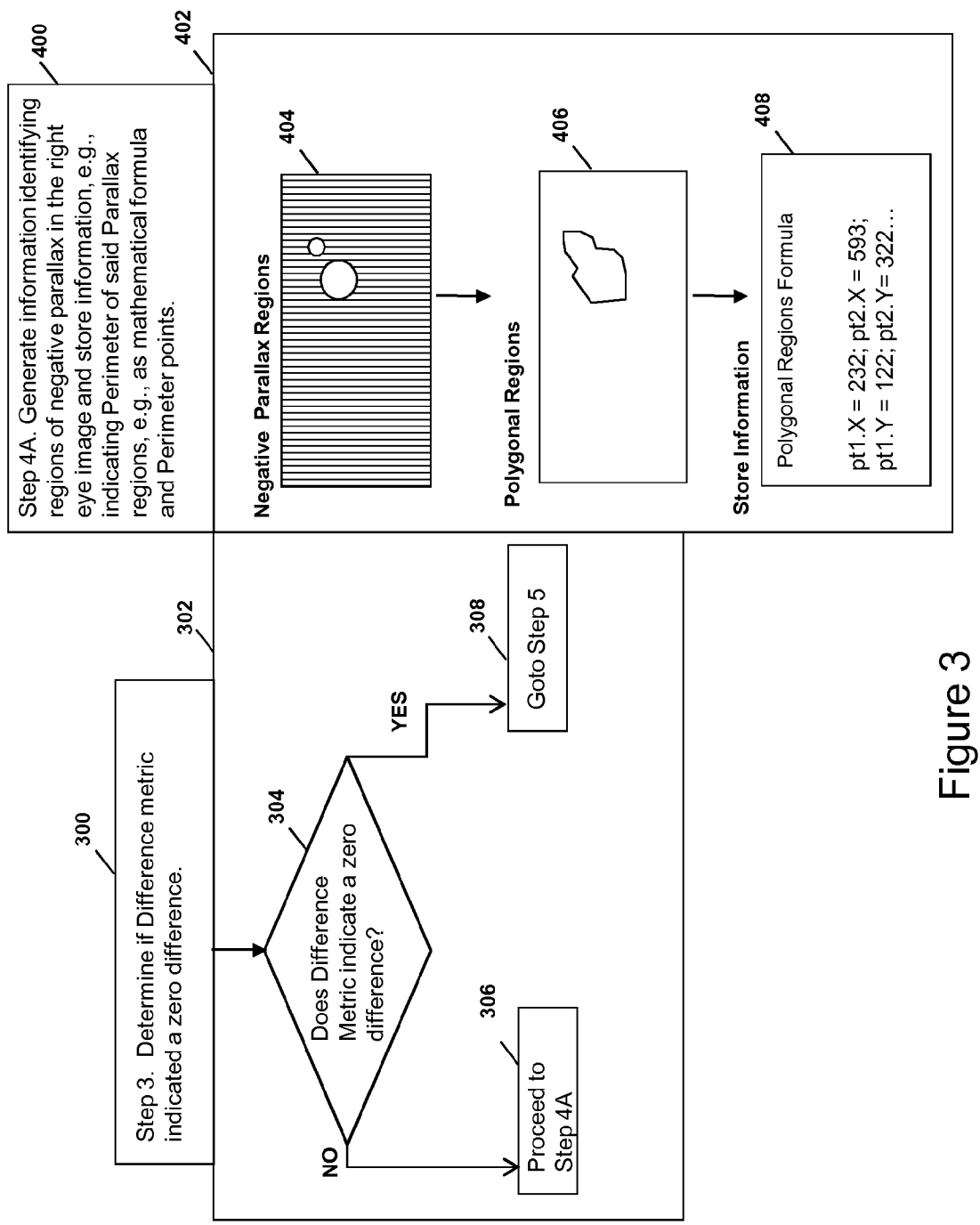

Operation proceeds from step 2B to step 3 300 shown in FIG. 3. Step 3 300 includes determining if the difference metric (e.g., generated in step 2A) indicates a zero difference in luminance information between the left and right eye images. As shown in box 302, sub-step 304 represents a decision step the outcome of which controls how the processing proceeds based on the determination of whether the difference metric indicated a zero difference or not. In decision step 304 if it is determined that the difference metric indicated a non-zero difference, e.g., a difference between the left and right eye images was detected, processing proceeds to step 4A as indicated in connecting node 306. If it is determined that the difference metric indicated a zero difference, the processing proceeds to step 5 500 as indicated in connecting node 408. Thus, for images where there is no difference, the identification of regions of negative parallax and entropy reduction operations are skipped reducing computational requirements as compared to if these steps were performed.

Operation proceeds from step 3 to step 4A 400 also shown in FIG. 3, when it is determined that the difference metric indicated a non-zero difference. Step 4A 400 includes generating information identifying the detected regions of negative parallax in the right eye image and storing the region identifying information. The stored information 408 identifying regions of negative parallax in the right eye image may indicate the perimeter of the parallax regions, e.g., as combination of mathematical formula(s) and/or perimeter points. The defined polygonal region(s) include the edges of the negative parallax regions as shown in box 406 wherein the negative parallax regions are included in the defined region perimeter shown in box 406. In various embodiments the information identifying regions of negative parallax includes information defining the perimeter of at least one polygonal region, e.g., as shown in box 406.

Figure 4:
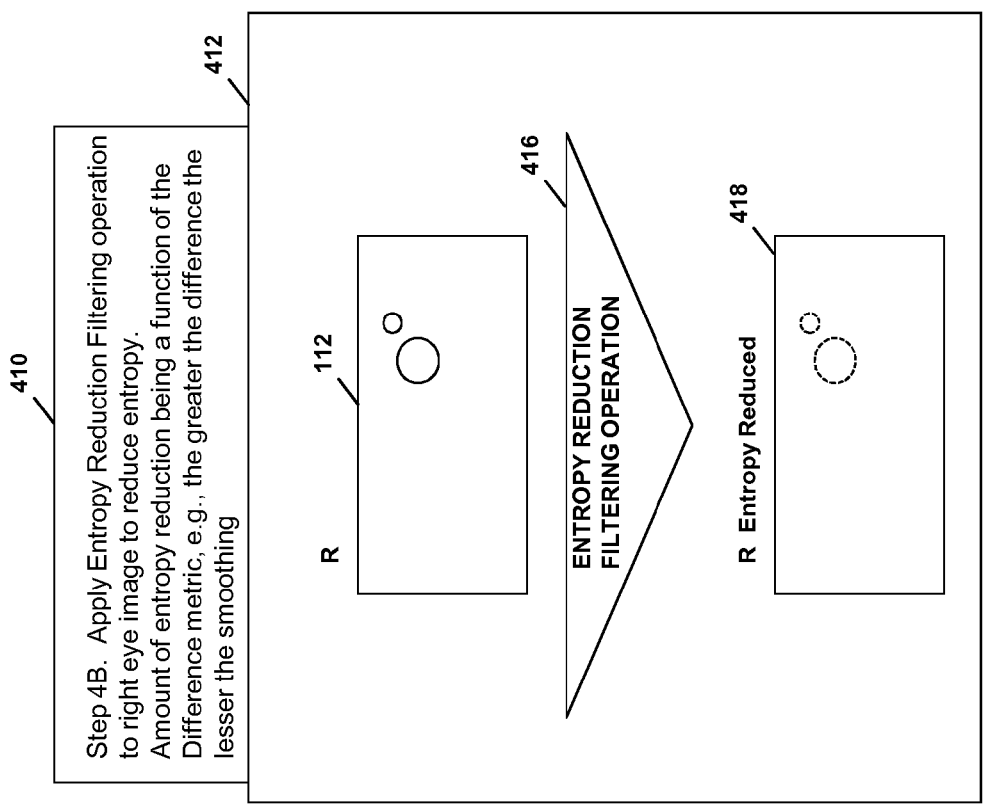

Operation proceeds from step 4A to step 4B. FIG. 4 illustrates step 4B 410 which includes applying an entropy reduction filtering operation to right eye image 414 to reduce entropy. The filtering operating 416 may be an FFT based filtering operation or a neighborhood filtering operation. The entropy reduction filtering operation 416 reduces the contrast within the image 112 and produces an entropy reduced right eye image 418. Box 412 in FIG. 4 shows subjecting the right eye image 112 to entropy reduction filtering operation 416 to generate the entropy reduced right eye image 418.

In various embodiments the amount of entropy reduction performed by filtering step 416 is a function of the difference metric, e.g., the greater the amount of difference, the lesser the smoothing. Thus a higher difference metric, in some embodiments results in less entropy reduction than a lower difference metric.

Figure 5:
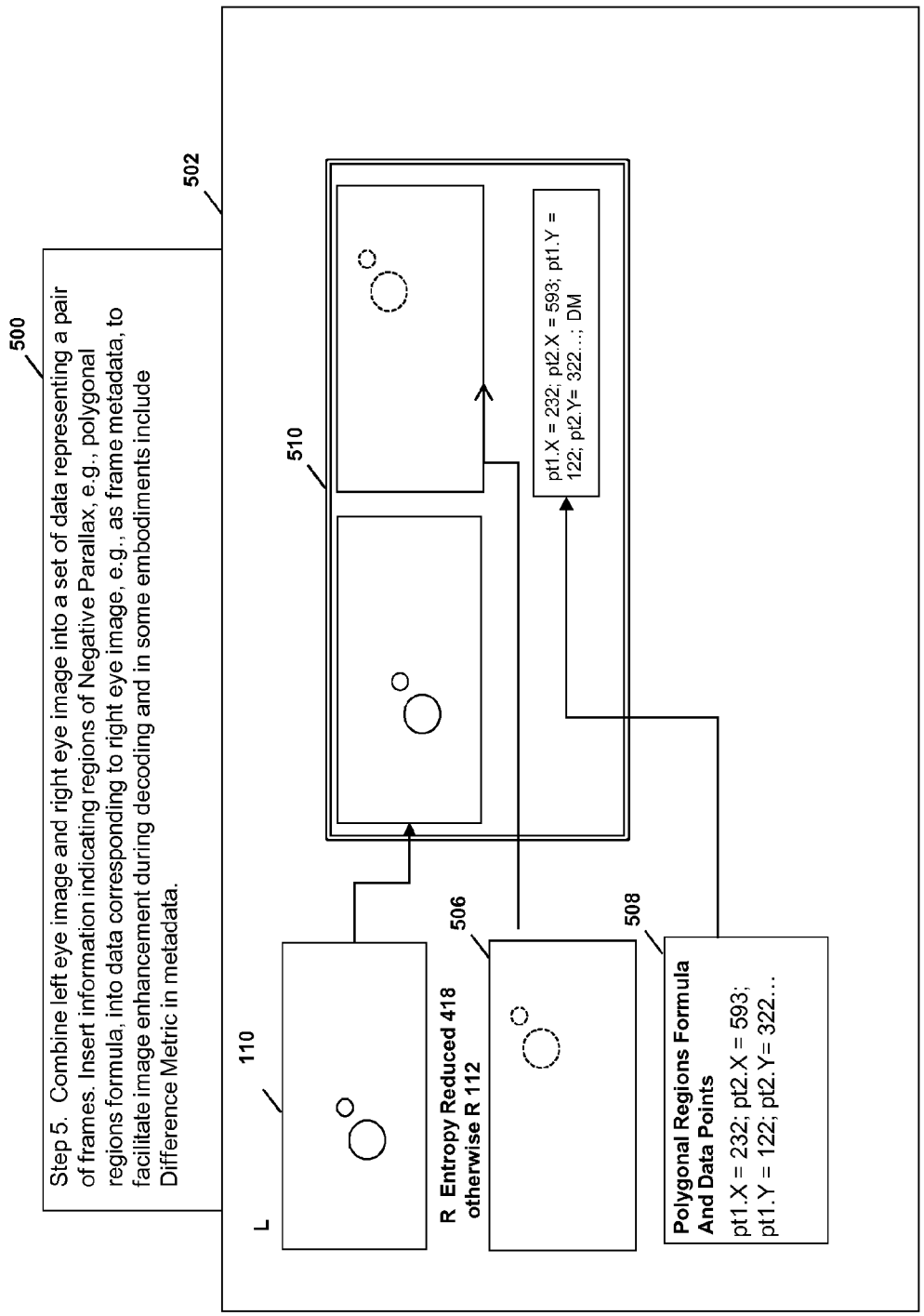

FIG. 5 illustrates step 5 500, which is performed in accordance with one exemplary embodiment. Step 5 500 includes combining left and right eye images of an image pair into a set of data representing a pair of frames in accordance with the invention. Step 5 500 also includes, in some embodiments, inserting information indicating regions of negative parallax, e.g., polygonal regions formula, into data corresponding to right eye image, e.g., as frame metadata, to facilitate image enhancement during decoding. In some embodiments the included metadata also includes the difference metric (DM) 210 for the image pair which was determined in step 200. If entropy reduction was performed, step 500 includes the entropy reduced right eye image otherwise the right eye image 112 is included in the image pair. Thus the pair of frames 510 includes the left-eye view 110, the right-eye view 418 or 112 (the entropy-reduced eye image 418 is include when the difference metric indicates a non-zero difference indicating it was generated otherwise the right eye image 112 is used) and information identifying regions of negative parallax in the right eye image 508 if it was generated.

Figure 6:
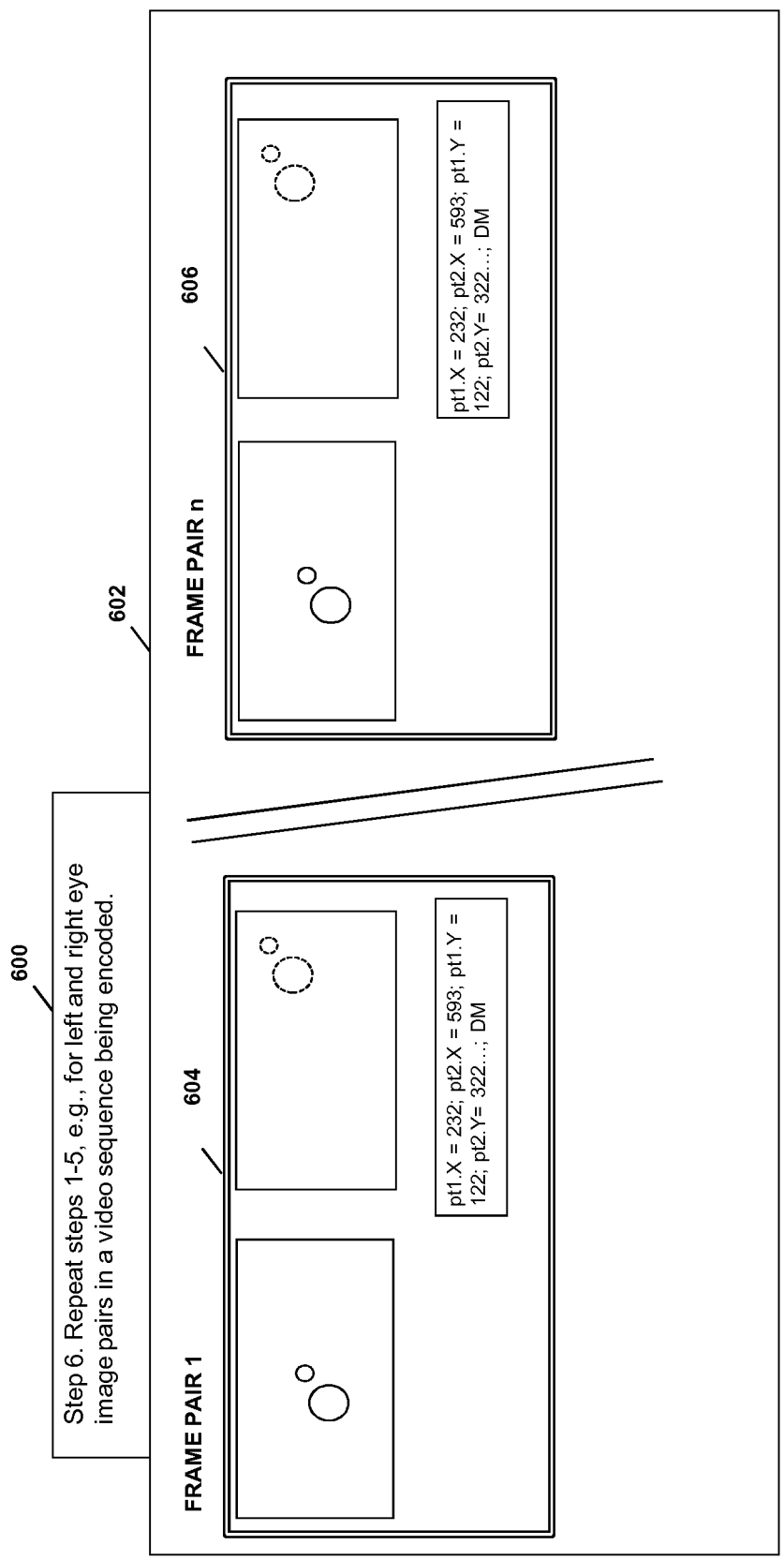

Operation proceeds from step 5 to step 6 600 shown in FIG. 6. Step 6 600 includes repeating steps 1 through 5, e.g., for left and right eye image pairs in a video sequence being encoded, in accordance with the invention. Thus as shown in box 602 frame pair 1 604 through frame pair n 606 are generated for a given video sequence being encoded.

Figure 7:
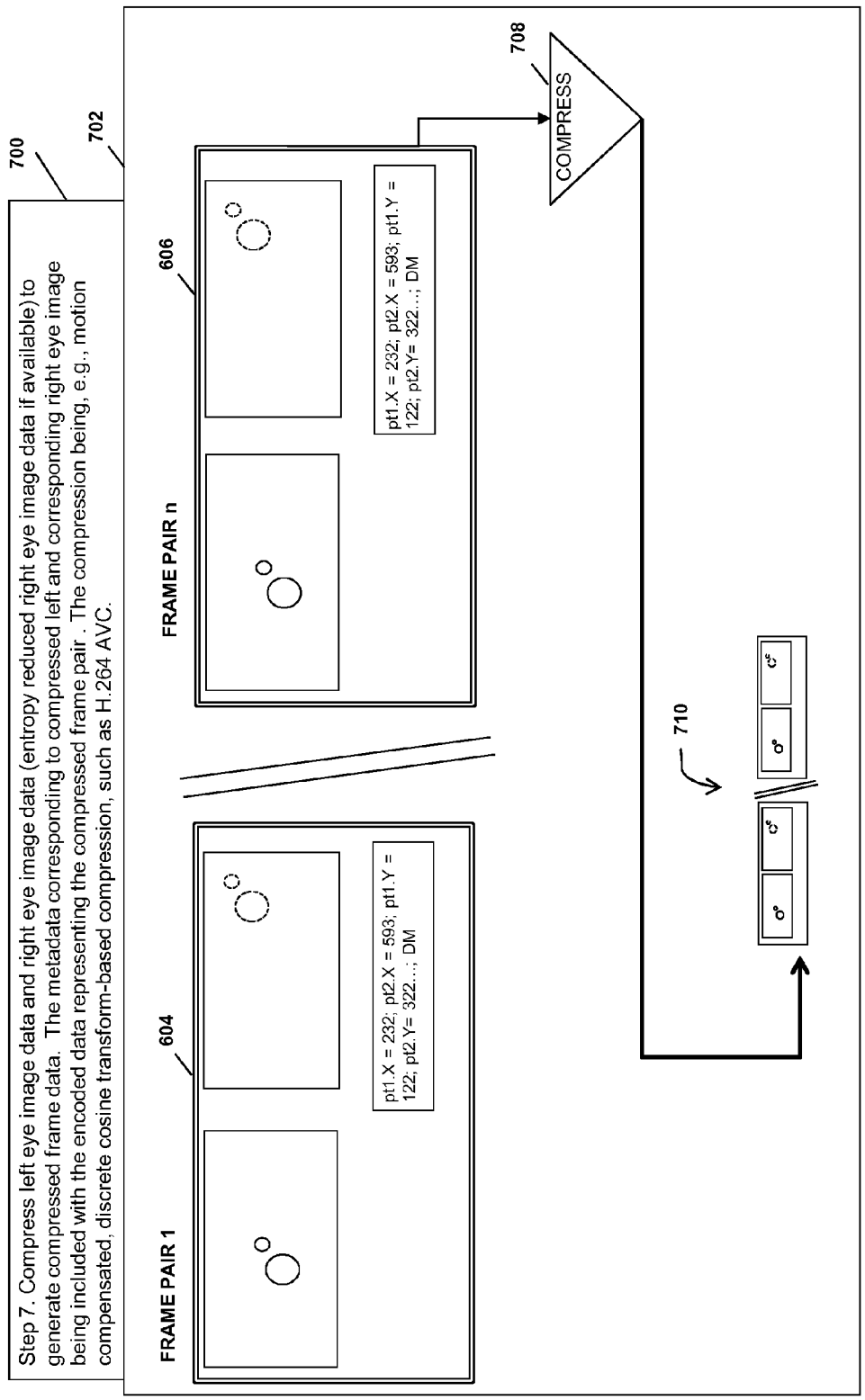

The input to step 7 700 shown in FIG. 7 is the image data generated in FIG. 6. Note that the left and right eye image data is arranged so that the left and right eye images are presented for encoding/compression in an interleaved manner facilitating data compression and efficient encoding. Step 7 700 includes the compression of left eye image data and entropy right eye image data included in the pairs of frame data 604, 606 to compressed frame data, i.e., compressed left and right eye image data and associated metadata. The encoded frame pairs generated by compression step 708 form a video stream. Thus step 7 700 includes the compression of the processed stereoscopic video sequence, in the form of frame pairs (e.g., frame pair 1 604, . . . , frame pairs n 606) by the element 708, in accordance with one aspect of the invention, e.g., using motion compression algorithms which can, and in some embodiments are, implemented using one or more compression methods that may employ a discrete cosine transform, Advanced video coding standard H.264 AVC is one example of a compression method that may be used to compress the sequence of frames in the frame pairs 604, 606 but other compression standards might be used instead. The output of the compression operation, i.e., the compressed frame pairs and associated metadata are indicated by reference 710.

Figure 8:
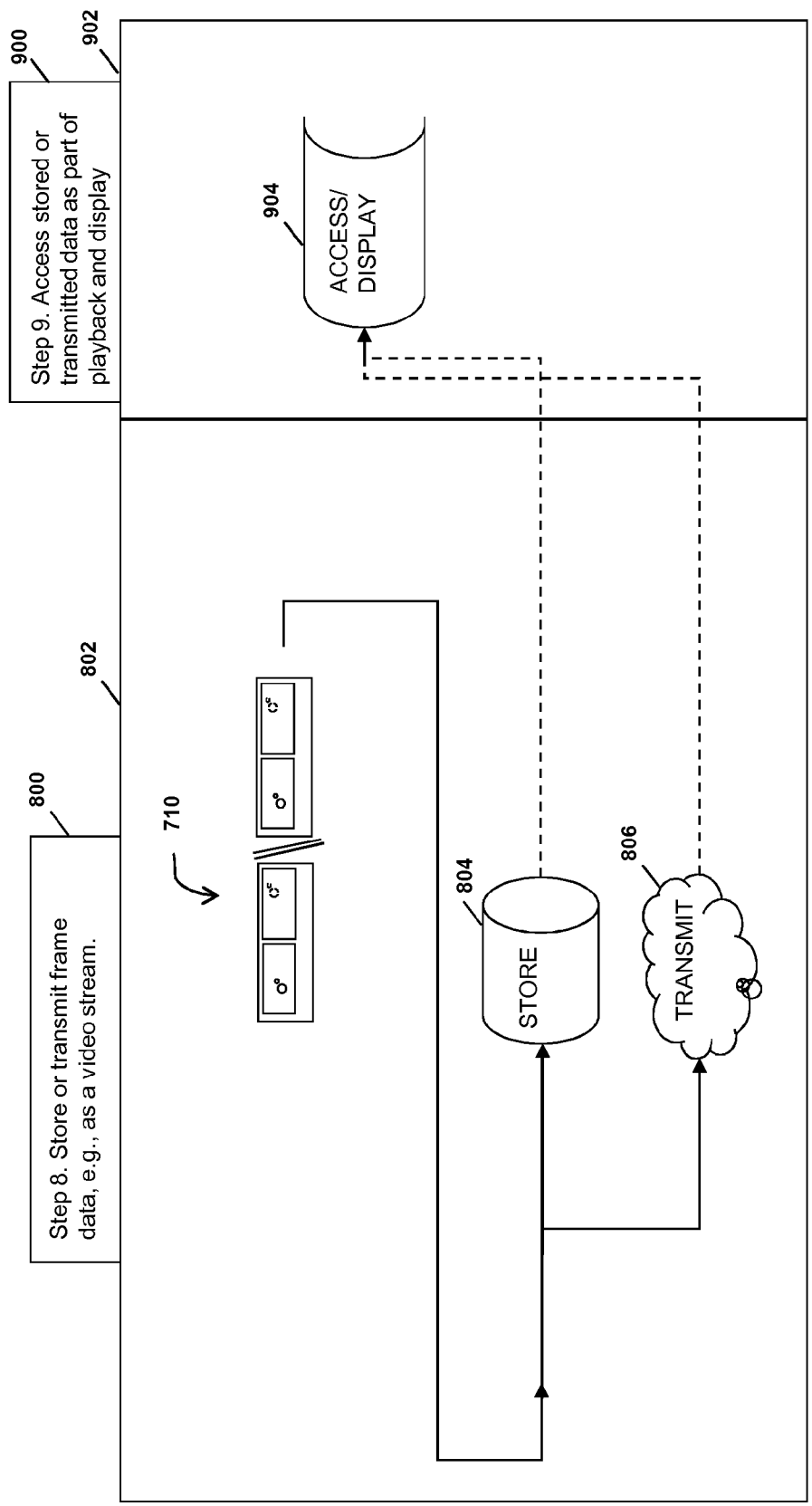

FIG. 8 illustrates step 8 800 and step 9 900 which are performed in some embodiments. As should be appreciated playback may occur at a different location from the location where the encoded video is produced, stored and/or transmitted from. However, in some embodiments to allow a user of the encoder to view and consider the quality of the encoded images, decoding and display of images may, and in some embodiments is, performed on the same system used to encode image data. Step 8 800 includes the storage 804 and/or transmission 806 of the processed, e.g., encoded, frame pairs generated in accordance with the invention. The encoded information which is stored or transmitted includes the metadata indicating the difference metric and regions of negative parallax for entropy reduced images in frame pairs. In step 9 900 the processed frame pair(s) generated in accordance with the invention is received by a playback device, e.g., a player located at a customer premise or room which may be remote from the storage and/or transmitter location, or is simply accessed from where it is stored. The playback device includes a processor, e.g., a graphics processing unit (GPU) capable of operating as a video decoder in accordance with the invention and is capable of rendering stereoscopic images from the encoded video received by the playback device. The access and/or display operation is shown using reference number 904.

Figure 9:
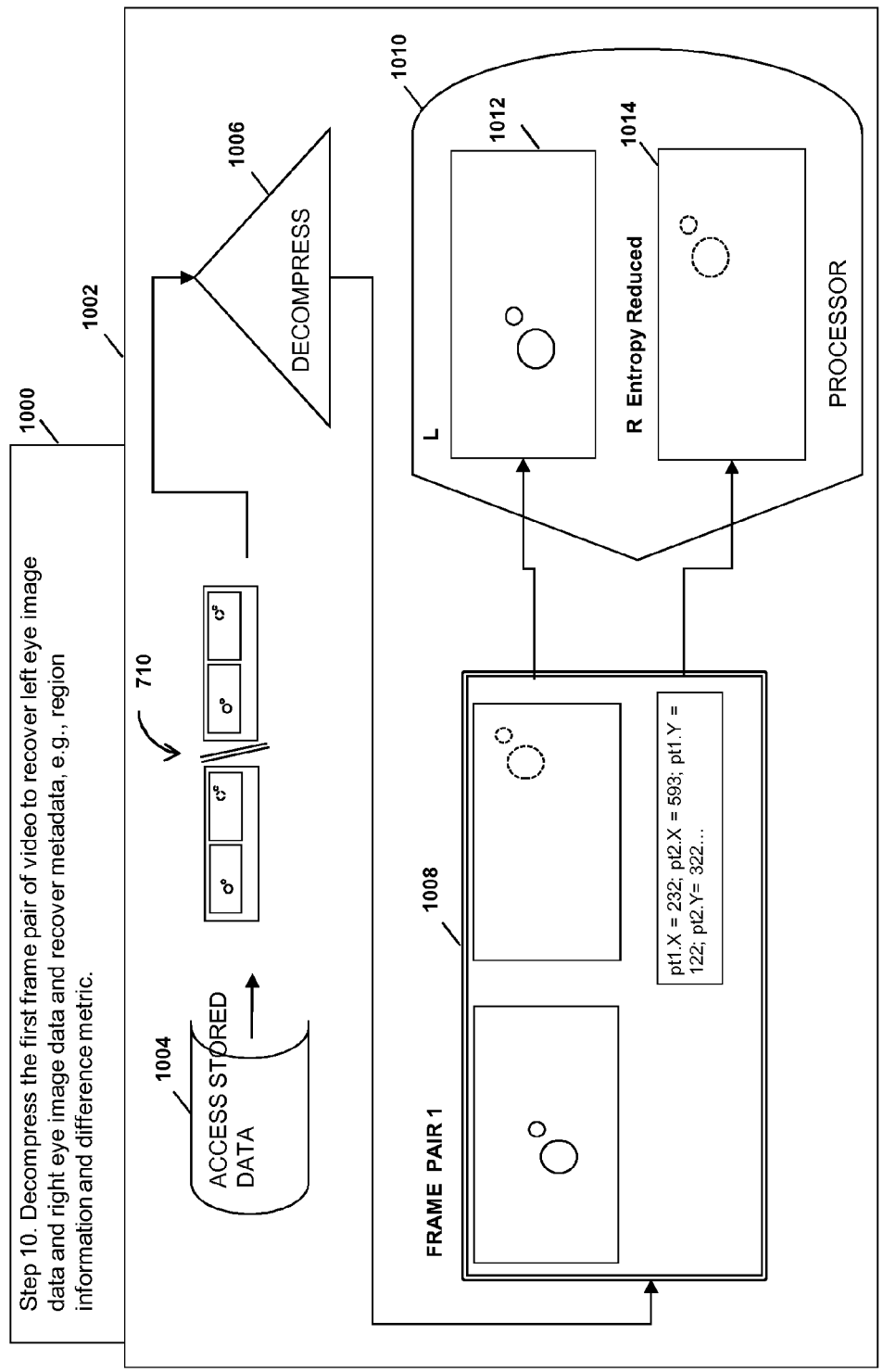

FIG. 9 illustrates step 10 1000 showing decompression of encoded frames as part of the decoding and display process in accordance with an exemplary embodiment of the invention. Step 10 1000 includes decompressing the received and/or retrieved first frame pair of the encoded frame pairs 710, to recover left eye image data and right eye image data and to recover metadata associated with the first frame pair 1008. The processing is illustrated in the sequential manner as shown in box 1002. The decompression operation is illustrated by element 1006 and the recovered first frame pair 1008 including the left eye image data, right eye image data and the metadata is also shown. The metadata includes, e.g., polygon region information corresponding to regions of negative parallax in the entropy reduced image of the decoded frame pair and the difference metric for the decoded frame pair determined during the encoding process. The decompression step 1006 may involve use of the decoder or decoder portion of a codec used to the compression standard used to compress the frames being decoded. The decoded left frame 1012 and decoded right frame 1014 are supplied in step 1010 to the processor for additional processing. The right frame, e.g., right eye image 1014 is shown as an entropy reduced right eye image but would be a non-entropy reduced image if entropy processing was not performed as part of the encoding process, e.g., when there is zero difference between the left and right eye images.

Figure 10:
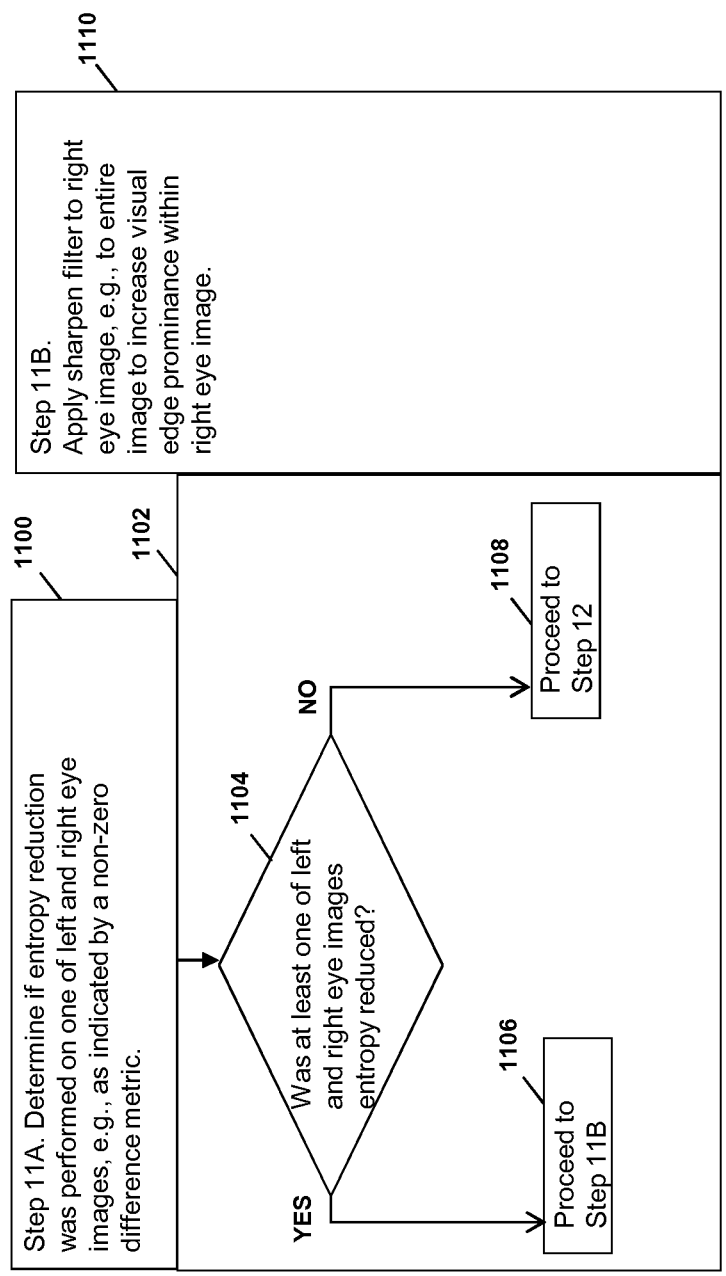

Operation proceeds from step 10 to step 11A shown in FIG. 10. Step 11A 1100 includes determining if entropy reduction was performed on one of the left and right eye images. In various embodiments the determination whether entropy reduction was performed on one of the left and right eye images, is performed by determining if there is a non-zero difference indicated by the difference metric, e.g., included in the recovered metadata. Alternatively, in embodiments where the difference metric is not communicated, the decoded left and right eye images may be compared and a difference metric generated in the decoder.

As shown in box 1102, sub-step 1104 represents a decision step the outcome of which controls how the processing may proceed based on the determination of step 11A, i.e., if entropy reduction was performed on one of the left and right eye images. In decision step 1104 if it is determined that entropy reduction was performed on one of the left and right eye images, the processing proceeds to step 11B as indicated in connecting node 1106. If it is determined that entropy reduction was not performed on one of the left and right eye images, the processing proceeds directly to step 12 as indicated in connecting node 1108.

In step 11B a sharpening filtering operation is performed on the image which was subject to an entropy reduction operation, e.g., the right eye image. The sharpening tends to increase visual edge prominence within right eye image. Thus a sharpened version of the entropy reduced right eye image is produced as a result of applying the sharpening filter operation. The sharpen entropy reduced image 1106 is processed in step 11C 1100.

Figure 11:
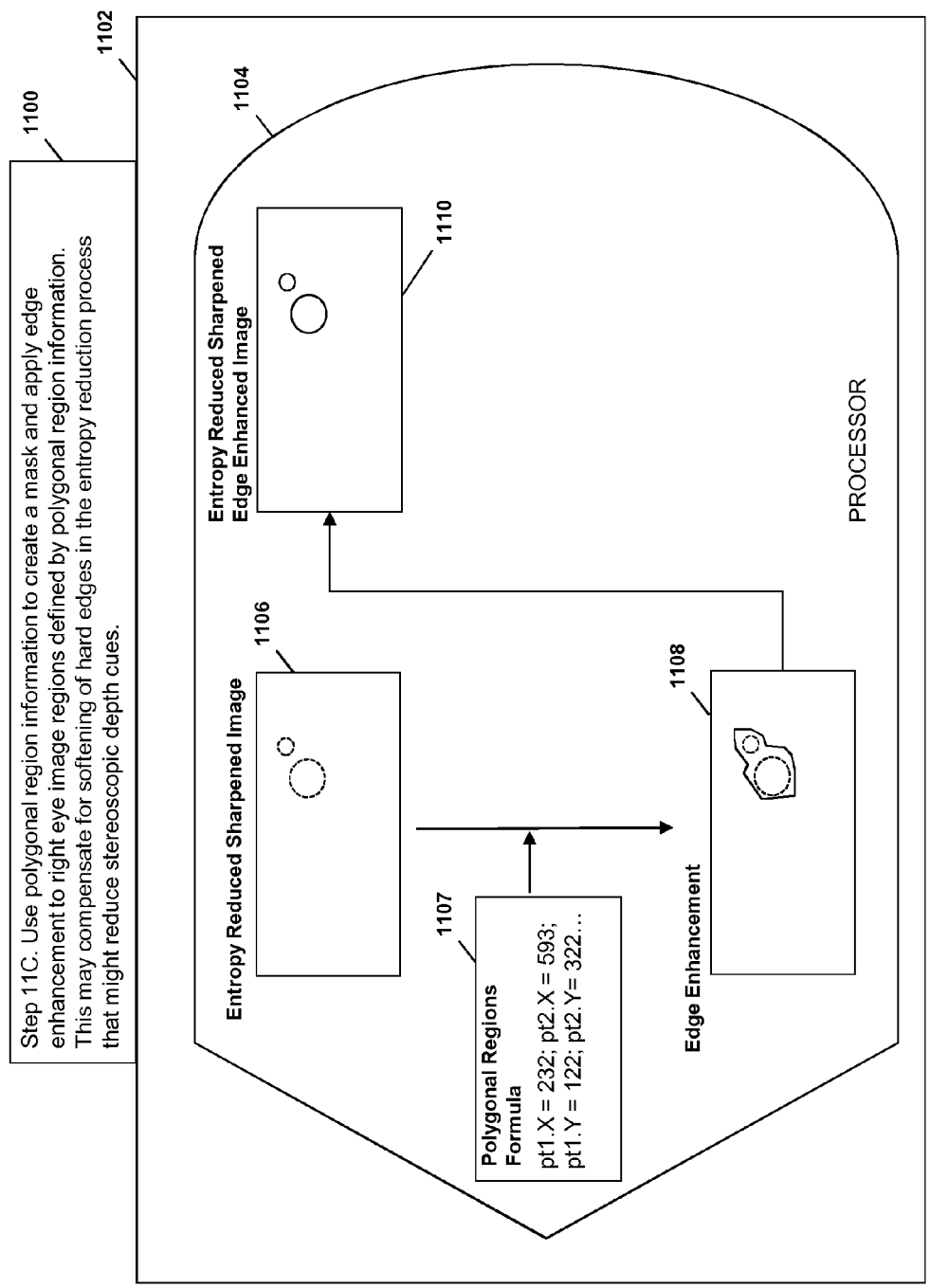

FIG. 11 illustrates step 11C which includes the creation of a filter mask using the polygonal region information 1107, and application of edge enhancement to image regions within the sharpened entropy reduced image 1106 (the right eye image in the example) defined by the filter mask created using the polygonal region information 1107. Thus as shown in box 1102, in step 11C edge enhancement of portions of the decoded entropy reduced right eye image 1106, which are areas in which negative parallax was detected, is performed by applying edge enhancement operation. This edge enhancement strengths the edges within the identified regions and tends to compensate for softened image edges due to the entropy reduction process that might destructively interfere with stereoscopic depth cues. Thus edges which correspond to areas where stereoscopic depth cues are of concern are enhanced more than edges in other portions of the image. The output of the edge enhancement operation as done in step 11C is shown as sharpened edge enhanced right eye image 1110. Note that edge enhancement is not performed in some embodiments to the entire decoded entropy reduced image to avoid increasing the strength of block coding artifacts throughout the entire image, e.g., artificial edges at block coding boundaries resulting from the block coding used to generate the encoded frames.

Figure 12:
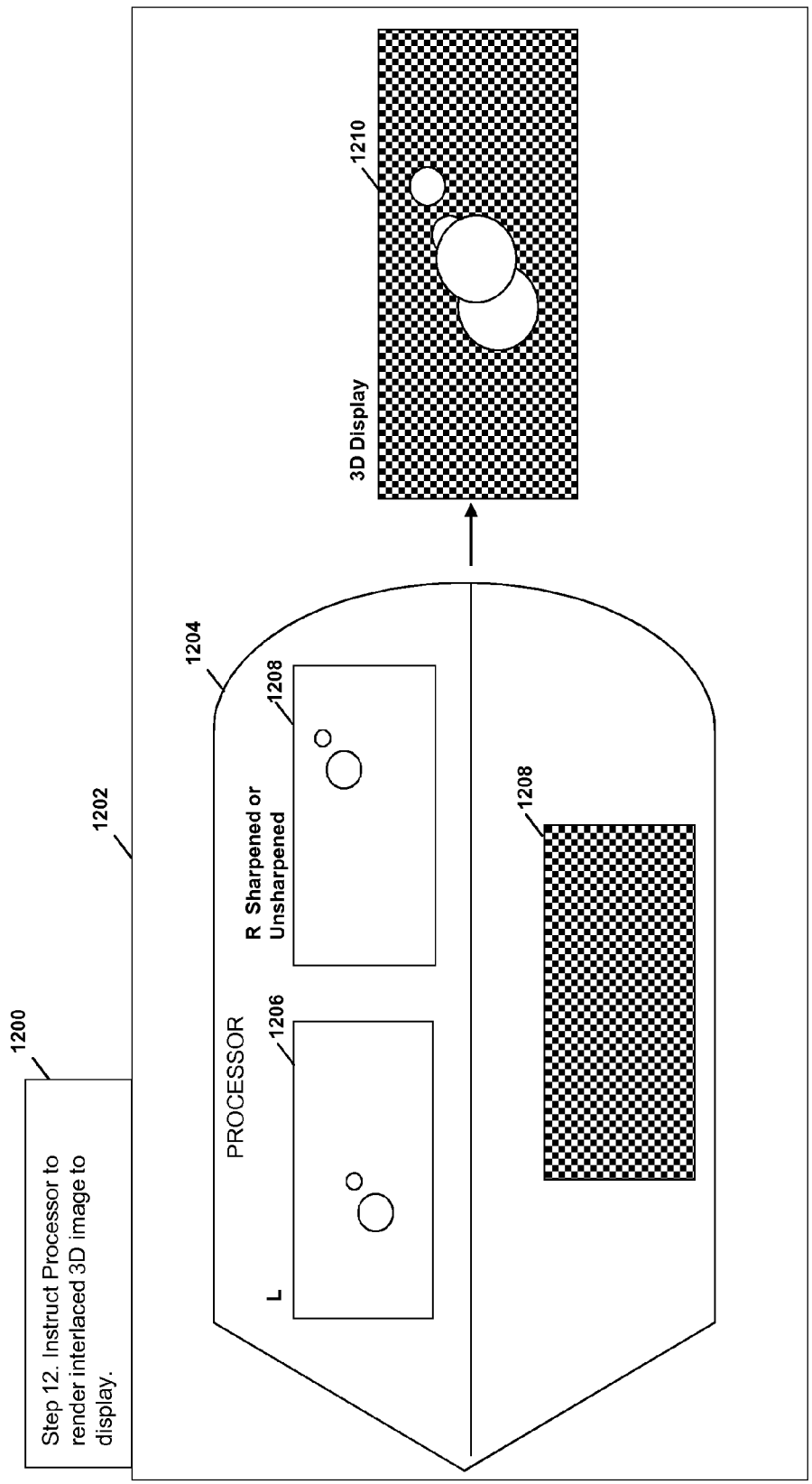

With the recovered image data having been enhanced to improve 3D effects which may have been adversely impacted by the compression and entropy reduction process, operation proceeds to step 1220 which is a rendering step. FIG. 12 illustrates step 12 1200 which includes the use of a processor, e.g., a graphic processing unit (GPU), to render the left-eye view 1206 with the right-eye view 1208. The right eye view will be the sharpened edge enhanced right eye view for frame pairs where entropy reduction was previously applied to the right eye view. If no entropy reduction was applied to either eye image, the decoded frames are supplied to the processor for rendering without enhancement. The rendered image(s) generated by the processor in step 1204 from the recovered left and right eye image data is output to a 3D display device in step 1210. The rendering and output by the processor may be display device dependent. In some but not necessarily all embodiments, a checkerboard mask 1208 is used in the image rendering process performed in step 1204. The rendering may be performed in a known manner using the left and right image data 1206, 1208.

Figure 13:
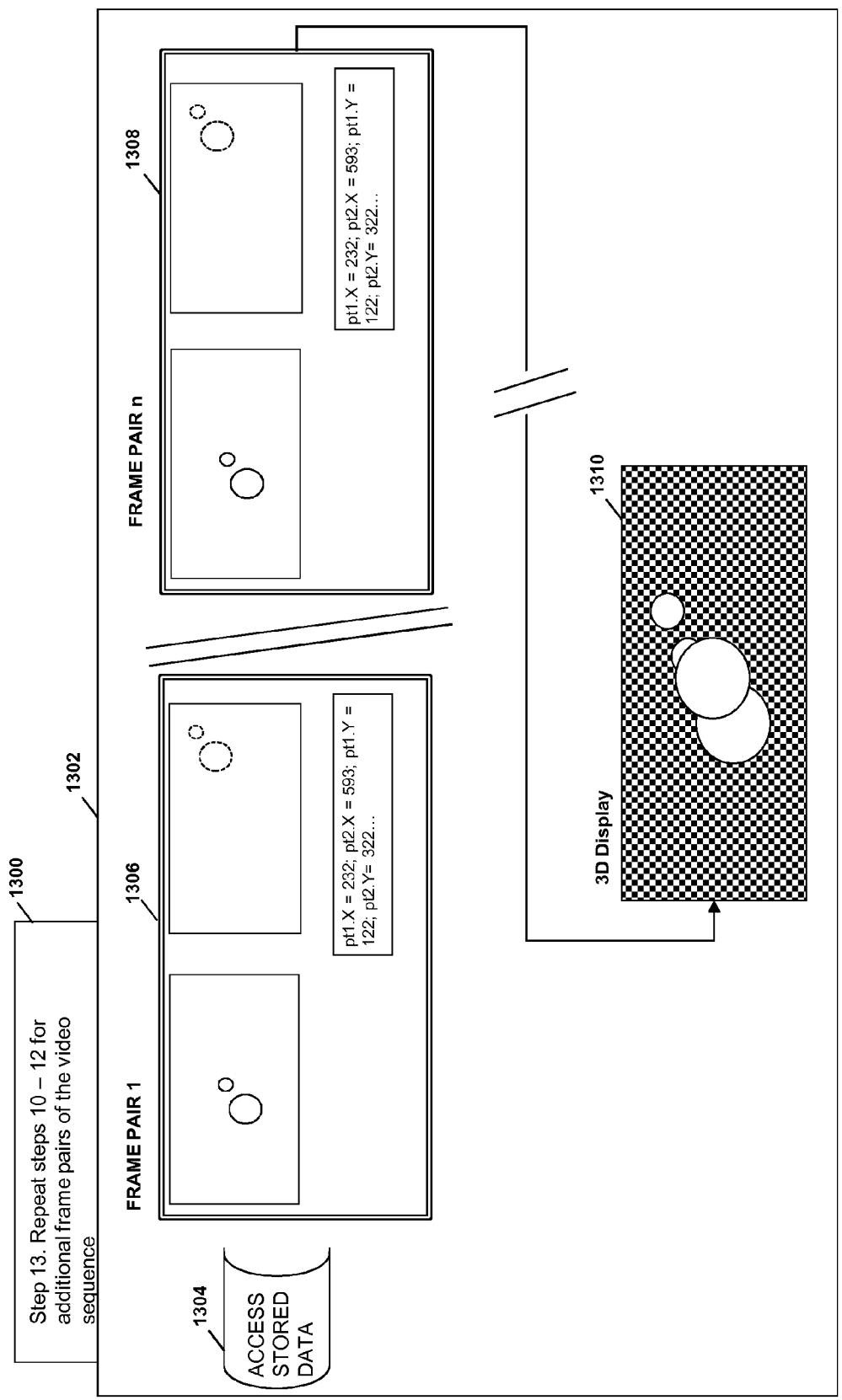

FIG. 13 illustrates step 13. In step 13 steps 10 to 12, as applicable, are repeated as the remaining frame pairs in the stereoscopic video sequence are decoded and output for display.

Figure 14:
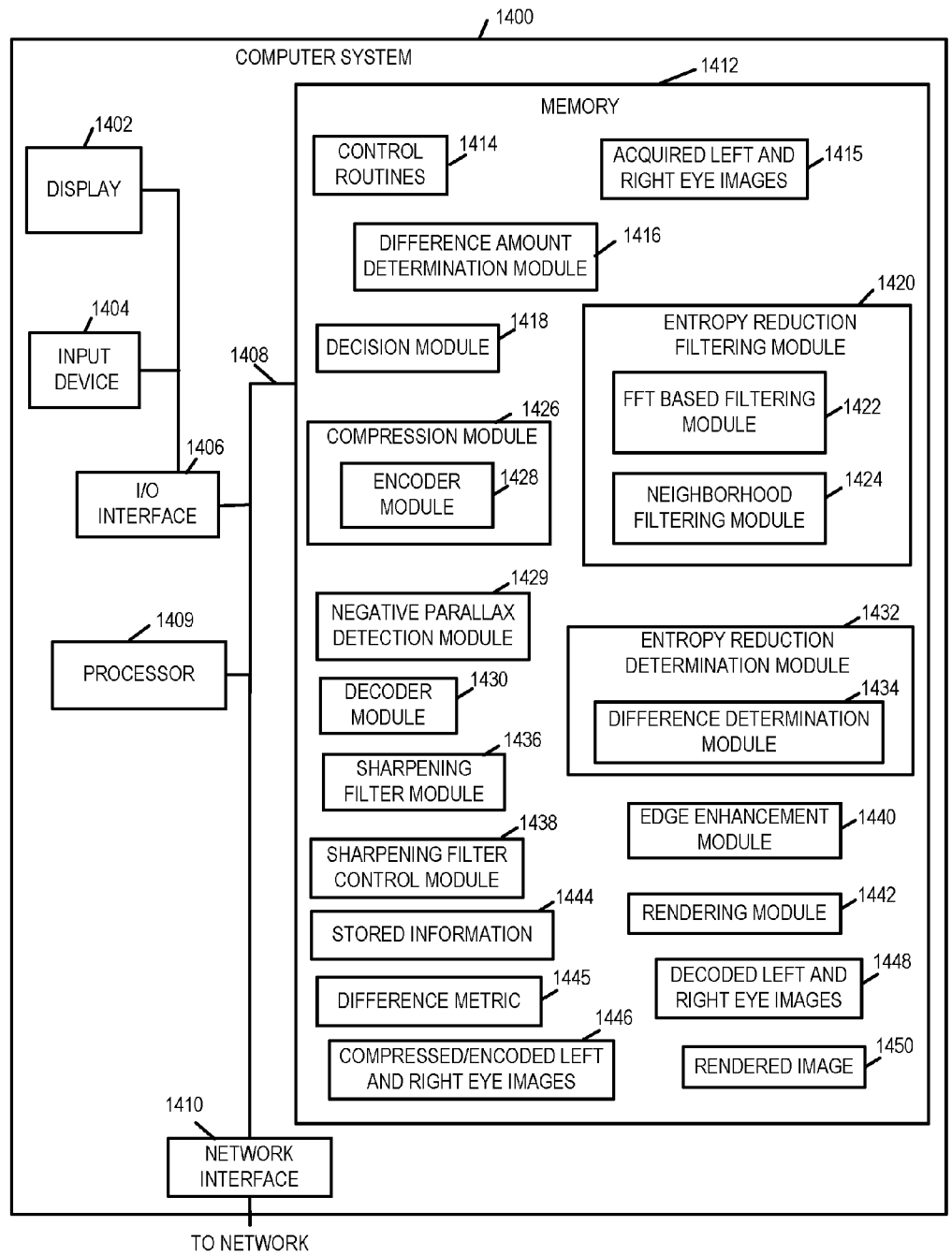
FIG. 14 illustrates a computer system or other hardware encoder and/or player which may be used to perform video encoding, storage, transmission, reception decoding, display and/or other operations in accordance with the invention.

FIG. 14 illustrates a computer system 1400 which may be used to perform video encoding, storage, transmission, reception, decoding, display and/or other operations in accordance with the invention. It should be appreciated that while the system 1400 can be used to perform encoding and display options, more limited devices may perform some but not the full set of functions supported by the system 1400. For example, a playback device may implement the reception, decoding and display features but not the image encoding or capture features of the exemplary embodiment.

The computer system 1400 includes a display device 1402, input device 1404, I/O interface 1406, processor 1409, network interface 1410, and memory 1412. The display device 1402 may be used, e.g., to display images resulting from processing implemented in accordance with the present invention. Input device 1404 may be, e.g. a keyboard or other user input device. The display 1402 and input device 1404 are coupled to a bus 1408 by I/O interface 1406. The bus 1408 is also coupled to the memory 1412, processor 1409 and network interface 1410. The network interface 1410 couples the internal components of the system 1400 to an external network, e.g., the Internet, thereby allowing the system 1400 to receive and send data over a network. The processor 1409 controls operation of the computer system 1400 under direction of software modules and/or routines stored in the memory 1412.

The I/O interface 1404 is used for receiving and/or transmitting information from other devices. For example, in some embodiments the I/O interface 1404 is used for transmitting the compressed left and right eye images to another device, e.g., a playback device. The I/O interface 1404 is also used in some embodiments for receiving a file including the encoded frames of stereoscopic image data, said file including a plurality of frame pairs which were interleaved to form a left and right eye image sequence prior to encoding.

The memory 1412 includes a software control routines 1414 e.g., machine executable instructions, for implementing one or more of the above-described processing methods of the present invention. Memory 1412 includes the acquired left and right eye images image 1415, a difference amount determination module 1416, a decision module 1418, a compression module 1420 including an encoder module 1422, an entropy reduction filtering module 1424, a negative parallax detection module 1429, a decoder module 1430, an entropy reduction determination module 1432, a sharpening filter module 1436, a sharpening filter control module 1438, an edge enhancement operation module 1440, a rendering module 1442, stored information 1444, encoded left and right eye images file 1446, decoded left and right eye images file 1448, and rendered image 1450. In various embodiments the entropy reduction filtering module 1424 includes a FFT (Fast Fourier Transform) based filtering module 1426 and neighborhood filtering module 1428. In various embodiments the entropy reduction determination module 1432 includes a difference determination module 1434.

Various modules shown in the memory 1412 are executed by the processor 1409 to perform various functions in accordance with a method of the present invention. The acquired left and right eye images 1415 are the images captured by separate left and right cameras. The acquired left and right eye images 1415 may have undergone some processing, e.g., to put the acquired images in a suitable format for storing and further r processing. The left and right eye images form a first image pair. The difference amount determination module 1416 performing a comparison operation for comparing right eye image and left eye image to determine a difference between right eye image and left eye image of the first image pair. In various embodiments the difference amount determination module 1416 compares right eye image and left eye image luminance information to identify areas of difference, and produces a difference metric as the output of comparison. In various embodiments the difference metric 1445 indicating the amount of difference in the luminance information of the left and right eye images is stored in the memory 1412.

The decision module 1418 makes a decision whether or not an entropy reduction filtering operation is to be performed based on the amount of difference determined by the difference amount determination module 1416, e.g., as indicated by the difference metric. In various embodiments when it is determined that there is a non-zero amount of difference between the left and right eye images, the decision module 1418 decides that entropy reduction filtering will be performed, and otherwise not. The entropy reduction filtering module 1420 performs an entropy reduction operation on right eye image data representing the right eye image of the first image pair to produce entropy reduced right eye image data, when it is determined that there is a non-zero amount of difference between the left and right eye images. In some embodiments the entropy reduction operation is a function of the determined amount of difference between said left eye image and the right eye image, the amount of entropy reduction being greater when the amount of difference is a first amount than when it is a second amount, said second amount being greater than said first amount. Thus entropy reduction is greater when the amount of difference is less. In various embodiments the entropy reduction filtering module 1420 includes a module 1422 and a module 1424 for performing at least one of an FFT based filtering operation or performing neighborhood filtering operation on said right eye image data to smooth the right eye image.

The compression module 1426 performs compression operation on the left and right eye images in accordance with the invention, and includes an encoder module 1428 which performs encoding operation on the left eye image data representing the left eye image of the first image pair to generate compressed left eye image data, and performs encoding on the entropy reduced right eye image data to generate compressed right eye image data, e.g., when entropy reduction has been performed on the right eye image. In various embodiments the encoder module 1428 performs inter-frame motion compensated encoding, data corresponding to said left and right eye images being processed as data corresponding to sequential frames. In some embodiments motion compensated discrete cosine transform based compression, such as H.264 AVC is used for encoding. The file 1446 including the compressed/encoded left and right eye images is an output of the compression module 1426.

The negative parallax detection module 1429 detects image regions in the right eye image which are in negative parallax relative to a corresponding portion of the left eye image. In various embodiments information identifying one or more detected image regions of negative parallax in the right eye are stored in a file with the compressed left and right eye image data, in the memory 1412. In some embodiments the negative parallax determination 216 generates information identifying regions of negative parallax in the right eye image and store information, e.g., indicating perimeter of the parallax regions, e.g., as a mathematical formula and perimeter points, in the memory 1412. In various embodiments the information identifying regions of negative parallax includes information defining the perimeter of at least one polygonal region, e.g., representing a detected region of negative parallax. In some embodiments the file 1446 also includes information identifying at least one detected image region of negative parallax in the right eye image.

The decoder module 1430 performs decompression and decoding on the encoded frames representing left and right eye images of an image pair to recover decoded left and right eye image data as part of the decoding and display process in accordance with an exemplary embodiment of the invention. In various embodiments the metadata associated with the image pair being decoded is also recovered during the decoding operation performed by the decoder module 1430. The metadata includes, e.g., polygon region information and in some embodiments the difference metric. The file 1448 including the decoded left and right eye images is an output of the decoder module 1430.

The entropy reduction determination module 1432 determines whether or not the entropy reduction operation was performed on one of the left and right eye images prior to encoding. In various embodiments the determination whether entropy reduction was performed on one of the left and right eye images, is performed by determining if there is a non-zero difference between said left and right eye images. In various embodiments the entropy reduction determination module 1432 includes a difference determination module 1434 which determines the difference between decoded (recovered) left and right eye images. In some embodiments the entropy reduction determination module 1432 is configured to determine if a difference indicator value associated with at least one of the encoded left and right eye images indicates a difference between the left and right eye images. If the difference indicator value indicates a non-zero difference, the determination module 1432 determines that entropy reduction operation was performed one of the left and right eye images.

The sharpening filter module 1436 performs a sharpening filtering operation using decoded eye image data corresponding to the one of the left and right eye images which was subject to an entropy reduction operation, to produce a sharpened version of the entropy reduced image when it is determined that that one of the left and right eye images was subject to an entropy reduction operation prior to encoding, the entropy reduced image being the one of the left and right eye images which was subject to an entropy reduction operation. The sharpening operation is performed, e.g., to increase visual edge prominence within entropy reduced eye image. The sharpening filter control module 1438 controls the strength of the sharpening filter 1436 used to perform the sharpening operation as a function of the difference indicator value when it is determined that that one of said left and right eye images was subject to an entropy reduction operation, the control module 1438 controlling a higher amount of sharpening to be performed when the difference indicator value indicates a smaller difference than when the difference indicator value indicates a larger difference.

The edge enhancement module 1440 performs edge enhancement operation on the entropy reduced eye image regions, e.g., image regions of one of the left and right eye image which was subject to an entropy reduction operation. In various embodiments the entropy reduced eye image regions are defined by a mask created using the polygonal region information, e.g., image portions identified as negative parallax regions, by information associated with the entropy reduced image as discussed earlier. Thus the edge enhancement module 1440 performs sharpening of the decoded entropy reduced eye image. This sharpening may compensate for softened image edges in the entropy reduction process that might destructively interfere with stereoscopic depth cues.

The rendering module 1442 performs rendering operation rendering a 3-D image from the sharpened version of the entropy reduced image (or unsharpened version depending on whether entropy reduction was previously applied or not) and the decoded other one of the left and right eye images which was not subject to an entropy reduction operation. A rendered 3-D image 1450 may be then displayed on the display 1402.

In accordance with some embodiments an exemplary method of operating an encoder apparatus to encode stereoscopic image data representing pairs of first and second eye images, each first eye image in an image pair corresponding to one of a left eye image and a right eye image, the second eye image of each image pair corresponding to the other one of the left and right eye images, comprises: determining an amount of difference between a first eye image and a second eye image of a first image pair; when it is determined that there is a non-zero amount of difference between the first eye image and the second eye image of said first image pair, performing the steps of: i) performing an entropy reduction operation on second eye image data representing the second eye image of the first image pair to produce entropy reduced second eye image data; ii) encoding first eye image data representing the first one of the eye images of said first image pair to generate compressed first eye image data; and iii) encoding said entropy reduced second eye image data to generate compressed second eye image data; and storing or transmitting the compressed first eye image data and compressed second eye image data.

In some embodiments said encoding said entropy reduced second eye image data includes supplying said entropy reduced second eye image data to an encoder which performs inter-frame motion compensated encoding, data corresponding to said first and second eye images being processed as data corresponding to sequential frames. In some embodiments said entropy reduction operation is a function of the determined amount of difference between said first eye image and said second eye image, the amount of entropy reduction being greater when the amount of difference is a first amount than when it is a second amount, said second amount being greater than said first amount.

In some embodiments said entropy reduction operation includes performing at least one of an FFT based filtering operation or a neighborhood filtering operation on said second eye image data to smooth the second eye image of said first image pair. In some embodiments the exemplary encoding method further includes: performing a negative parallax detection operation to detect image regions in said second eye image of said first image pair which are in negative parallax relative to a corresponding portion of said first eye image of said first image pair; and storing information identifying at least one detected image region of negative parallax in said second eye image of said first image pair in a file with said compressed first eye image data and compressed second eye image data.

In some embodiments the exemplary encoding method further includes: storing information indicating said amount of difference in said file with said compressed first eye image data and compressed second eye image data. In some embodiments the detected image regions are polygonal image regions; and the information identifying at least one detected image region of negative parallax includes information defining the perimeter of at least one polygonal image region.

In some embodiments the information defining the perimeter of the at least one polygonal image region of negative parallax includes information identifying points in said second eye image corresponding to the perimeter and a formula for determining a portion of said perimeter from said identified locations of points corresponding to the perimeter.

In some embodiments when it is determined that there is a zero amount of difference between the first eye image and the second eye image of said first image pair, the exemplary method of encoding comprises performing, prior to performing said storing or transmitting step, the steps of: ii) encoding said first eye image data to generate compressed first eye image data; and iii) encoding said second eye image data to generate compressed second eye image data. In some embodiments encoding said second eye image data generates compressed second eye image data indicating that the second eye image is the same as the first eye image. In various embodiments the exemplary encoding method further includes: processing a second image pair including a left eye image and a right eye image.

In accordance with some embodiments an exemplary apparatus to encode stereoscopic image data representing pairs of first and second eye images, comprises: a determination module for determining an amount of difference between a first eye image and a second eye image of a first image pair; an entropy reduction filtering module for performing an entropy reduction operation on second eye image data representing the second eye image of the first image pair to produce entropy reduced second eye image data, when it is determined that there is a non-zero amount of difference between the first eye image and the second eye image of said first image pair; a compression module for encoding first eye image data representing the first one of the eye images of said first image pair to generate compressed first eye image data, and for encoding said entropy reduced second eye image data to generate compressed second eye image data; and a storage module for storing the compressed first eye image data and compressed second eye image data. In some embodiments the exemplary apparatus further includes: an interface for transmitting the compressed first eye image data and compressed second eye image data;

In some embodiments the compression module for encoding said entropy reduced second eye image data includes an encoder which performs inter-frame motion compensated encoding, data corresponding to said first and second eye images being processed as data corresponding to sequential frames. In some embodiments the entropy reduction operation is a function of the determined amount of difference between said first eye image and said second eye image, the amount of entropy reduction being greater when the amount of difference is a first amount than when it is a second amount, said second amount being greater than said first amount.

In some embodiments the entropy reduction filtering module includes a module for performing at least one of an FFT based filtering operation or a neighborhood filtering operation on said second eye image data to smooth the second eye image of said first image pair. In some embodiments the exemplary apparatus for encoding further comprises: a negative parallax detection module for performing a negative parallax detection operation to detect image regions in said second eye image of said first image pair which are in negative parallax relative to a corresponding portion of said first eye image of said first image pair. In some embodiments the storage module further stores information identifying at least one detected image region of negative parallax in said second eye image of said first image pair in a file with said compressed first eye image data and compressed second eye image data.

In some embodiments the storage module further stores information indicating said amount of difference in said file with said compressed first eye image data and compressed second eye image data.

In some embodiments the detected image regions are polygonal image regions; and the information identifying at least one detected image region of negative parallax includes information defining the perimeter of at least one polygonal image region. In some embodiments the information defining the perimeter of the at least one polygonal image region of negative parallax includes information identifying points in said second eye image corresponding to the perimeter and a formula for determining a portion of said perimeter from said identified locations of points corresponding to the perimeter.

In accordance with one embodiment an exemplary method of processing encoded frames of stereoscopic image data, comprises: decoding first and second encoded frames representing first and second eye images of an image pair to recover decoded first and second eye image data; determining if one of said first and second eye images was subject to an entropy reduction operation prior to encoding; when it is determined that that one of said first and second eye images was subject to an entropy reduction operation prior to encoding: i) performing a sharpening operation, using decoded eye image data corresponding to the one of the first and second eye images which was subject to an entropy reduction operation, to produce a sharpened version of the entropy reduced image, said entropy reduced image being the one of the first and second eye images which was subject to an entropy reduction operation; and ii) rendering a 3-D image from said sharpened version of the entropy reduced image and the decoded one of the first and second eye images which was not subject to an entropy reduction operation.

In accordance with one feature of some embodiments the sharpening operation increases a visual edge prominence within the image being subject to said sharpening. In some embodiments determining if one of said first and second eye images was subject to an entropy reduction operation prior to encoding includes determining if there is a difference between said first and second eye images. In some embodiments determining if one of said first and second eye images was subject to an entropy reduction operation prior to encoding includes determining if a difference indicator value associated with at least one of said first and second encoded frames indicates a difference between the first and second eye images.

In some embodiments when it is determined that that one of said first and second eye images was subject to an entropy reduction operation, the exemplary method processing encoded frames of stereoscopic image data further comprises: controlling the strength of a sharpening filter used to perform said sharpening operation as a function of said difference indicator value, a higher amount of sharpening being performed when said difference indicator value indicates a smaller difference than when said difference indicator value indicates a larger difference. In some embodiments when it is determined that that one of said first and second eye images was subject to an entropy reduction operation prior to encoding, the exemplary method includes performing an edge enhancement operation on said sharpened version of the entropy reduced image prior to using said sharpened version of the entropy reduced image in said rendering step.

In some embodiments the edge enhancement operation is performed on image portions identified as negative parallax regions, by information associated with said entropy reduced image. In some embodiments the exemplary method of processing encoded frames of stereoscopic image data includes: receiving a file including said encoded frames of stereoscopic image data, said file including a plurality of frame pairs which were interleaved to form a left and right eye image sequence prior to encoding. In some embodiments information is included in said received file for at least one pair of frames indicating an amount of difference between the images represented by said at least one pair of frames and information identifying at least one region of negative parallax in one of said frames which was generated from an image subjected to an entropy reduction operation.

In some embodiments when said determining indicates that one of said first and second eye images was not subject to an entropy reduction operation, the method further includes rendering a 3-D image from said first and second eye image data without performing a sharpening operation.

In accordance with one embodiment, an exemplary apparatus for processing encoded frames of stereoscopic image data, comprises: a decoder module for decoding first and second encoded frames representing first and second eye images of an image pair to recover decoded first and second eye image data; an entropy reduction determination module for determining if one of said first and second eye images was subject to an entropy reduction operation prior to encoding; a sharpening filter module for performing a sharpening operation, using decoded eye image data corresponding to the one of the first and second eye images which was subject to an entropy reduction operation, to produce a sharpened version of the entropy reduced image when it is determined that that one of said first and second eye images was subject to an entropy reduction operation prior to encoding, said entropy reduced image being the one of the first and second eye images which was subject to an entropy reduction operation; and a rendering module for rendering a 3-D image from said sharpened version of the entropy reduced image and the decoded one of the first and second eye images which was not subject to an entropy reduction operation.

In some embodiments the exemplary apparatus further includes an interface for receiving a file including said encoded frames of stereoscopic image data, said file including a plurality of frame pairs which were interleaved to form a left and right eye image sequence prior to encoding.

In some embodiments said sharpening operation performed by the sharpening filter module increases visual edge prominence within the image being subject to said sharpening. In some embodiments the entropy reduction determination module includes a difference determination module for determining if there is a difference between said first and second eye images. In some embodiments the entropy reduction determination module is further configured to determine if a difference indicator value associated with at least one of said first and second encoded frames indicates a difference between the first and second eye images.

In some embodiments the exemplary apparatus further comprises a control module for controlling the strength of a sharpening filter used to perform said sharpening operation as a function of said difference indicator value when it is determined that that one of said first and second eye images was subject to an entropy reduction operation, said control module controlling a higher amount of sharpening to be performed when said difference indicator value indicates a smaller difference than when said difference indicator value indicates a larger difference. In some embodiments the exemplary apparatus further includes an edge enhancement operation module for performing an edge enhancement operation on said sharpened version of the entropy reduced image. In some embodiments the edge enhancement operation is performed on image portions identified as negative parallax regions, by information associated with said entropy reduced image.

Some advantages of the present invention which should be appreciated include, without limitation, that stereoscopic video can be distributed to customers using less storage and transmission bandwidth than conventional stereoscopic video and, furthermore, that the player's processor, e.g., graphic processing unit, can be applied to reduce the hardware burden of rendering stereoscopic video to the display.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of processing encoded frames of stereoscopic image data, the method comprising:
   decoding first and second encoded frames representing first and second eye images of an image pair to recover decoded first and second eye image data;
   determining if one of said first and second eye images was subject to an entropy reduction operation prior to encoding;
   when it is determined that that one of said first and second eye images was subject to an entropy reduction operation prior to encoding:
   i) performing a sharpening operation, using decoded eye image data corresponding to the one of the first and second eye images which was subject to an entropy reduction operation, to produce a sharpened version of the entropy reduced image, said entropy reduced image being the one of the first and second eye images which was subject to an entropy reduction operation; and
   ii) rendering a 3-D image from said sharpened version of the entropy reduced image and the decoded one of the first and second eye images which was not subject to an entropy reduction operation.

2. The method of claim 1, wherein said sharpening operation increases edge prominence within the image being subject to said sharpening.

3. The method of claim 1, wherein determining if one of said first and second eye images was subject to an entropy reduction operation prior to encoding includes:
   determining if there is a difference between said first and second eye images.

4. The method of claim 1, wherein determining if one of said first and second eye images was subject to an entropy reduction operation prior to encoding includes:
   determining if a difference indicator value associated with at least one of said first and second encoded frames indicates a difference between the first and second eye images.

5. The method of claim 4, wherein when it is determined that that one of said first and second eye images was subject to an entropy reduction operation, the method further comprises:

controlling the strength of a sharpening filter used to perform said sharpening operation as a function of said difference indicator value, a higher amount of sharpening being performed when said difference indicator value indicates a smaller difference than when said difference indicator value indicates a larger difference.

6. The method of claim 2, further comprising:
when it is determined that that one of said first and second eye images was subject to an entropy reduction operation prior to encoding:
performing an edge enhancement operation on said sharpened version of the entropy reduced image prior to using said sharpened version of the entropy reduced image in said rendering step.

7. The method of claim 6, wherein said edge enhancement operation is performed on image portions identified as negative parallax regions, by information associated with said entropy reduced image.

8. The method of claim 7, further comprises:
receiving a file including said encoded frames of stereoscopic image data, said file including a plurality of frame pairs which were interleaved to form a left and right eye image sequence prior to encoding.

9. The method of claim 8, wherein information is included in said file for at least one pair of frames indicating an amount of difference between the images represented by said at least one pair of frames and information identifying at least one region of negative parallax in one of said frames which was generated from an image subjected to an entropy reduction operation.

10. The method of claim 1, wherein when said determining indicates that one of said first and second eye images was not subject to an entropy reduction operation, the method further comprises:
rendering a 3-D image from said first and second eye image data without performing a sharpening operation.

11. An apparatus for processing encoded frames of stereoscopic image data, the apparatus comprising:
a decoder for decoding first and second encoded frames representing first and second eye images of an image pair to recover decoded first and second eye image data;
an entropy reduction determinator for determining if one of said first and second eye images was subject to an entropy reduction operation prior to encoding;
a sharpening filter for performing a sharpening operation, using decoded eye image data corresponding to the one of the first and second eye images which was subject to an entropy reduction operation, to produce a sharpened version of the entropy reduced image when it is determined that that one of said first and second eye images was subject to an entropy reduction operation prior to encoding, said entropy reduced image being the one of the first and second eye images which was subject to an entropy reduction operation; and
a renderer for rendering a 3-D image from said sharpened version of the entropy reduced image and the decoded one of the first and second eye images which was not subject to an entropy reduction operation.

12. The apparatus of claim 11, wherein said sharpening operation increases edge prominence within the image being subject to said sharpening.

13. The apparatus of claim 11, wherein said entropy reduction determination module includes:
a difference determinator for determining if there is a difference between said first and second eye images.

14. The apparatus of claim 11, wherein said entropy reduction determinator is further configured to determine if a difference indicator value associated with at least one of said first and second encoded frames indicates a difference between the first and second eye images.

15. The apparatus of claim 14, further comprising: a controller for controlling the strength of a sharpening filter used to perform said sharpening operation as a function of said difference indicator value when it is determined that that one of said first and second eye images was subject to an entropy reduction operation, said controller controlling a higher amount of sharpening to be performed when said difference indicator value indicates a smaller difference than when said difference indicator value indicates a larger difference.

16. The apparatus of claim 12, further comprising: an edge enhancement operator for performing an edge enhancement operation on said sharpened version of the entropy reduced image.

17. The apparatus of claim 16, wherein said edge enhancement operation is performed on image portions identified as negative parallax regions, by information associated with said entropy reduced image.

18. The apparatus of claim 17, further comprising:
an interface for receiving a file including said encoded frames of stereoscopic image data, said file including a plurality of frame pairs which were interleaved to form a left and right eye image sequence prior to encoding.

* * * * *